United States Patent
Mathias et al.

(10) Patent No.: US 9,870,207 B2
(45) Date of Patent: Jan. 16, 2018

(54) SOFTWARE DEVELOPMENT USING RE-USABLE SOFTWARE COMPONENTS

(71) Applicant: SAP SE, Walldorf (DE)

(72) Inventors: Elton Mathias, Nice (FR); Gilles Montagnon, Mougins (FR); Wihem Arsac, Biot (FR); Cedric Hebert, Mougins (FR); Jakub Sendor, San Francisco, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/978,725

(22) Filed: Dec. 22, 2015

(65) Prior Publication Data

US 2017/0177310 A1   Jun. 22, 2017

(51) Int. Cl.
*G06F 9/44* (2006.01)
*G06F 3/0484* (2013.01)

(52) U.S. Cl.
CPC .............. *G06F 8/36* (2013.01); *G06F 3/0484* (2013.01)

(58) Field of Classification Search
CPC ........................................................ G06F 8/36
USPC ................... 717/110–113, 168–178
See application file for complete search history.

(56) References Cited

U.S. PATENT DOCUMENTS

| | | | | |
|---|---|---|---|---|
| 5,063,600 A | * | 11/1991 | Norwood | G06F 3/04883 345/173 |
| 5,187,788 A | * | 2/1993 | Marmelstein | G06F 8/34 717/109 |
| 5,632,022 A | * | 5/1997 | Warren | G06F 3/0483 715/255 |
| 5,987,247 A | | 11/1999 | Lau | |
| 6,014,666 A | | 1/2000 | Helland et al. | |
| 6,042,614 A | | 3/2000 | Davidson et al. | |
| 6,640,249 B1 | * | 10/2003 | Bowman-Amuah | G06F 8/38 709/228 |
| 7,039,571 B1 | * | 5/2006 | Munger | G06F 8/38 434/30 |
| 7,076,784 B1 | | 7/2006 | Russell et al. | |
| 7,149,734 B2 | * | 12/2006 | Carlson | G06F 8/36 |
| 7,188,158 B1 | * | 3/2007 | Stanton | G06F 8/20 709/220 |
| 7,316,000 B2 | | 1/2008 | Poole et al. | |

(Continued)

OTHER PUBLICATIONS

Caldiera, Gianluigi, and Victor R. Basili. "Identifying and qualifying reusable software components." Computer 24.2 (1991): pp. 61-70.*

(Continued)

*Primary Examiner* — Satish Rampuria
(74) *Attorney, Agent, or Firm* — Brake Hughes Bellermann LLP

(57) ABSTRACT

A component selector may select a first software component stored in a software component library in conjunction with a first annotation, the first annotation being linked to a second annotation of a second software component via a link. An evaluation engine may evaluate a property expressed by the first annotation relative to a requirement expressed by the second annotation, and thereby verify compliance of the first software component and the second software component for inclusion within a software application being developed. A component update monitor may re-verify the compliance, based on an update to at least one of the first software component and the second software component.

19 Claims, 8 Drawing Sheets

(56) References Cited

U.S. PATENT DOCUMENTS

| | | | | |
|---|---|---|---|---|
| 7,761,848 B1* | 7/2010 | Chaffin | ............... | G06F 8/20 |
| | | | | 717/106 |
| 8,141,036 B2* | 3/2012 | Wagner | ............... | G06F 8/33 |
| | | | | 715/230 |
| 8,341,601 B2* | 12/2012 | Chan | ............... | G06Q 10/06 |
| | | | | 705/7.11 |
| 2003/0005412 A1* | 1/2003 | Eanes | ............... | G06F 8/34 |
| | | | | 717/120 |
| 2004/0139426 A1 | 7/2004 | Wu | | |
| 2005/0283751 A1 | 12/2005 | Bassin et al. | | |
| 2010/0257007 A1* | 10/2010 | Chan | ............... | G06Q 10/06 |
| | | | | 705/7.11 |
| 2010/0269099 A1* | 10/2010 | Yoshimura | ............ | G06F 8/36 |
| | | | | 717/122 |
| 2011/0078660 A1* | 3/2011 | Haber | ............... | G06F 8/75 |
| | | | | 717/124 |
| 2011/0179396 A1* | 7/2011 | Hamilton, II | ............ | G06F 8/36 |
| | | | | 717/100 |

OTHER PUBLICATIONS

Frakes, William B., and Thomas P. Pole. "An empirical study of representation methods for reusable software components." IEEE Transactions on Software Engineering 20.8 (1994): pp. 617-630.*

Levine, Trudy. "Reusable software components." ACM SIGAda Ada Letters 24.3 (2004): pp. 47-48.*

Nierstrasz, Oscar, Simon Gibbs, and Dennis Tsichritzis. "Component-oriented software development." Communications of the ACM 35.9 (1992): pp. 160-165.*

Hummel, Oliver, Werner Janjic, and Colin Atkinson. "Code conjurer: Pulling reusable software out of thin air." IEEE software 25.5 (2008). pp. 45-52.*

Mohagheghi, Parastoo, and Reidar Conradi. "Quality, productivity and economic benefits of software reuse: a review of industrial studies." Empirical Software Engineering 12.5 (2007): pp. 471-516.*

Non Final Office Action for U.S. Appl. No. 14/978,713, dated Mar. 23, 2017, 22 pages.

Boehm, "Managing Software Productivity and Reuse", Boehm; "Managing Software Productivity and Reuse"; Computer 32.9 (1999); pp. 111-113.

Hayes-Roth, et al., "A Domain-Specific Software Architecture for Adaptive Intelligent Systems", IEEE Transactions on software engineering 21.4 (1995); pp. 288-301.

Mernik, et al., "When and How to Develop Domain-Specific Languages", ACM computing surveys (CSUR) 37.4 (2005): pp. 316-344.

* cited by examiner

600

Determine a first software component previously created for use in a previous software application, the first software component being stored in the software component library in conjunction with the first annotation characterizing a first property of the first software component, wherein the first annotation is linked to a second annotation of a second software component
602

Determine a current software application under development
604

Verify compliance of the first software component with the second software component, based on the link between the first annotation and the second annotation
606

FIG.6

SOFTWARE DEVELOPMENT USING RE-USABLE SOFTWARE COMPONENTS

TECHNICAL FIELD

This description relates to automation of software development.

BACKGROUND

Many projects or tasks require efforts and decision-making across multiple domains of knowledge. It is often not feasible, or at least not common, for a single person or group to have sufficient expertise among all the multiple domains of knowledge to complete the associated project individually. Instead, collaborations between persons or groups possessing the required expertise in the relevant knowledge domains is required.

If such collaboration is conducted inefficiently, however, results of the projects or tasks may be impaired. For example, there may be a significant delay or increase in costs associated with completing a project, or a quality of the final project may be subpar.

For example, in the field of software development, a software architect may have expertise in constructing a software application, while a software security expert may have expertise in the security knowledge domain. If the software architect constructs a software application having security vulnerabilities or flaws, the security expert may be capable of identifying and correcting such vulnerabilities/flaws. However, as referenced above, if the vulnerabilities/flaws are not detected until late in the development software application, required corrections may be infeasible, or may be time and labor-intensive to implement. Thus, in these and other scenarios, it is difficult for software developers, or other collaborators, to work together in an efficient and productive manner.

SUMMARY

According to one general aspect, a computer program product may be tangibly embodied on a non-transitory computer-readable storage medium and include instructions that, when executed, are configured to cause at least one computing device to determine a first software component previously created for use in a previous software application, and stored in a software component library in conjunction with a first annotation characterizing a first property of the first software component, wherein the first annotation is linked to a second annotation of a second software component. The instructions, when executed by the at least one computing device, may be further configured to determine a current software application under development, verify compliance of the first software component with the second software component, based on the link between the first annotation and the second annotation, and include the first software component and the second software component within the current software application, based on the compliance.

According to another general aspect, a computer-implemented method for executing instructions stored on a non-transitory computer readable storage medium may include determining a first software component previously created for use in a previous software application, and stored in a software component library in conjunction with a first annotation characterizing a first property of the first software component, wherein the first annotation is linked to a second annotation of a second software component. The method may further include determining a current software application under development, verifying compliance of the first software component with the second software component, based on the link between the first annotation and the second annotation, and including the first software component and the second software component within the current software application, based on the compliance.

According to another general aspect, a system may include instructions recorded on a non-transitory computer-readable storage medium, and executable by at least one processor. The system may include a component selector configured to select a first software component stored in a software component library in conjunction with a first annotation, the first annotation being linked to a second annotation of a second software component via a link. The system may include an evaluation engine configured to evaluate a property expressed by the first annotation relative to a requirement expressed by the second annotation, and thereby verify compliance of the first software component and the second software component for inclusion within a software application being developed, and a component update monitor configured to re-verify the compliance, based on an update to at least one of the first software component and the second software component.

The details of one or more implementations are set forth in the accompanying drawings and the description below. Other features will be apparent from the description and drawings, and from the claims.

BRIEF DESCRIPTION OF THE DRAWINGS

FIG. 6 is a flowchart illustrating example operations of a component use manager of the system of FIG. 1.

DETAILED DESCRIPTION

Figure 1:
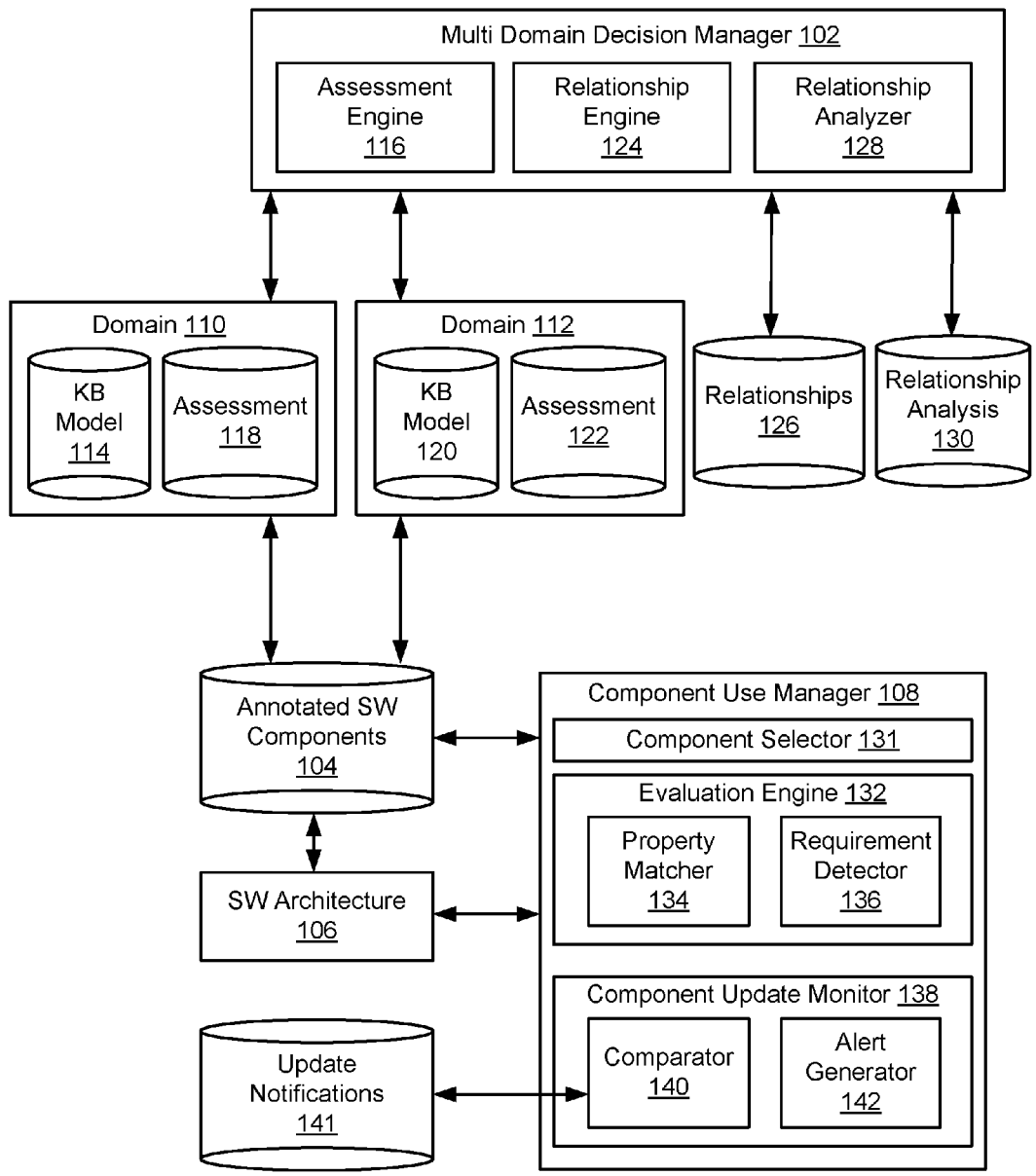
FIG. 1 is a block diagram of a system for multi-domain decision management and/or software component use management during software development.

FIG. 1 is a block diagram of a system 100 for multi-domain decision management and software component use management during software development. In the example of FIG. 1, a multi-domain decision manager 102 is configured to produce assessed, annotated software components 104 for use within a software architecture 106. More particularly, the multi-domain decision manager 102 enables production of the annotated software components 104, and of the software architecture 106, in a manner that provides timely, efficient interactions between software developers having expertise in two or more knowledge domains. Meanwhile, the component use manager 108 may be configured to enable subsequent reuse of the annotated software components 104 (where, as described below, the annotated software components 104 may be annotated independently of the multi-domain decision manager 102) within a same or different software architecture, thereby effectively leveraging efforts put into an original development of the annotated software components 104. Consequently, many different types and versions of high quality software may be developed in a timely, cost-effective, and efficient manner.

In the simplified example of FIG. 1, the multi-domain decision manager 102 represents hardware (e.g., one or more processors and associated non-transitory computer-readable storage medium for storing executable instructions thereon) and/or associated software for creating, accessing, and utilizing domain-specific knowledge, represented in FIG. 1 by a domain 110 and a domain 112. As referenced above, the term domain as used herein generally refers to an area or type of knowledge or expertise that can be defined or classified within the context of a larger collaborative effort. As also referenced, although the domains represented by the example domains 110, 112 may be part of a larger collaborative effort, the individual domains themselves may be heterogeneous in nature, with few, if any, apparent correlations there between.

In the example of FIG. 1, the multi-domain decision manager 102 enables a holistic view and understanding of domain knowledge across the example domains 110, 112, so that any decision maker is provided with an ability to understand causes and effects of a given change, across all domains. In many of the examples that follow, operations of the system 100 are described in the context of software development. In these and related contexts, relevant domains and associated domain experts (human or agent) may be defined with respect to, e.g., a product or application owner providing functional requirements, a software architect providing application design, and additional domain experts and domains related to non-functional requirements, including security, performance, quality, and/or usability.

In the example of FIG. 1, the domain 110 is illustrated as including a knowledge base model 114. The knowledge base model 114 generally represents structured data that includes all known relevant information within the domain 110. Meanwhile, an assessment engine 116 may be configured to generate an assessment 118, which represents an instance of the knowledge base model 114 that is instantiated with respect to one or more specific collaborative projects or tasks.

For example, as in the various examples provided below in more detail, the domain 110 may represent a software architecture domain, and a collaborative project may include development of a web-based software application. Then, the knowledge base model 114 may include structured data related to possible architectural implementations of web-based applications. For a particular software architect designing a particular web application, the assessment 118 would thus represent an instantiation of the knowledge base model 114 that is specific to the web-based application being developed. For example, the knowledge base model 114 may specify a requirement for a front end (e.g., client side) technology for an application being developed, as well as a back end (e.g., server side) technology. Then, for the assessment 118 for the specific application being developed, the front end technology may be specified as hypertext markup language (HTML), while the back end technology may be specified as using the C++ software language.

To continue the example, the domain 112 may represent a security domain for securing software applications being developed. Accordingly, a knowledge base model 120 may include structured data designed by a security expert (e.g., human or agent), that specifies and defines security concerns and potential solutions in the abstract, or across a wide range of potential software security environments. Again, the assessment engine 116 may be configured to generate the assessment 122 as an instantiation of the knowledge base model 120, e.g., representing specific security vulnerabilities and associated solutions chosen with respect to securing a particular application being developed. For example, the knowledge base model 120 may include and specify a number of different types of vulnerabilities, while the assessment 122 might specify specific ones of such vulnerabilities and associated solutions, including, e.g., vulnerabilities such as cross site scripting (XSS) or buffer overflow vulnerabilities.

Although not specifically illustrated in the simplified example of FIG. 1, it will be appreciated that one or more additional domains may be included in the system 100, including, e.g., performance domains and usability domains. For example, a performance domain might include requirements with respect to levels of speed, reliability, or cost of the application being developed (such as may be specified in a quality of service agreement). Meanwhile, a usability domain may be specific, for example, to user interface demands to ensure a smooth, predictable, and intuitive use of the application by future users thereof.

Of course, in the domains 110, 112, or in the various other domains that may be included, it may be possible to include two or more knowledge base models therein. Further, for each such knowledge base model, a plurality of instantiated assessments may be created, stored, and utilized. Accordingly, it should be appreciated that the knowledge base models 114, 120 and assessments 118, 122 should be understood to represent appropriate tables, databases, or other repositories for storing the associated data and data structures thereof.

As referenced above, the assessment engine 116 generally represents hardware and associated software for creating the assessment 118 from the knowledge base model 114, and for creating the assessment 122 from the knowledge base model 120. As described in more detail below with respect to FIG. 3, the assessment engine 116 may thus include appropriate components for executing user interactions with the user of the system 100 and of the multi-domain decision manager 102. For example, the assessment engine 116 may utilize an appropriate user interface for providing questions to the user, for receiving answers thereto, and utilizing the received answers to instantiate the assessments 118, 122. In this way, multiple individual users, e.g., multiple experts in their respective domains, each may utilize the multi-domain decision manager 102 to provide their respective areas of expertise and contributing, e.g., to the overall software development project.

Further in the example of FIG. 1, the multi-domain decision manager 102 is illustrated as including a relationship engine 124, which is configured to generate relationships 126. That is, as described in more detail below, the relationship engine 124 may be configured to interact with a human or agent user to define the types and relationships that exist between the domains 110, 112. As referenced above, it will be appreciated that the relationships 126 thus refer to an appropriate table, database, or other repository for storing a structured representation of such relationships.

Due to the above-described natures of the domains 110, 112, it may be difficult or impossible to define or rely upon semantic or ontological relationships between the domains 110, 112 for multi-domain decision management. For example, a description of a product functionality within the architecture domain 110 would be unlikely to share a semantic or syntactical relationship to a particular security flaw or associated risk. Accordingly, the types of the relationships 126 defined between the domains 110, 112 may be expressed as meta information characterizing bases for decision-making across, and consistent with, both of the domains 110, 112. For example, the types of relationships may specify that a particular element or aspect of the domain 110 is likely to be associated with a specific element or aspect of the domain 112. In other relationship types, elements or aspects of one domain may, e.g., negate, mitigate, enhance, or otherwise affect decision-making in one or both directions between the two domains 110, 112.

In some implementations, it may be possible to define some of the various relationship types and specific relationships between the knowledge base models 114, 120. For example, some such relationships may exist between corresponding properties for all known assessments/instantiations of the two knowledge base models 114, 120. Additionally, or alternatively, the various types of relationships may be defined as relationships between the individual assessments 118, 122, or portions thereof.

Further examples and explanations of the relationships 126 are provided below, e.g., with respect to FIG. 4. For purposes of FIG. 1, it should be appreciated that relationships defined for a particular collaborative project, such as a software development project, may be extremely numerous and complex, notwithstanding a capability of the relationship engine 124 to define and populate such relationships in a straightforward, efficient manner.

Moreover, two or more defined relationships may impact one another in a particular context. For example, if two relationships are defined as being associated with a particular result or requirement in another domain, it may occur in some scenarios that a cumulative or aggregated (relative or absolute) likelihood for the specified requirement will exist. On the other hand, for different types of relationships, such a cumulative effect may not occur, such as when the second relationship provides a diminishing return for the increased likelihood of the requirement in the second domain. Moreover, all such relationships, and relationships between relationships, may be defined between three or more relationships, as well as across two, three, or more of the domains being considered.

Therefore, considering the volume and complexity of the relationships 126, a relationship analyzer 128 may be configured to provide statistical or other analytic consideration of the relationships, to thereby provide relationship analysis 130. The relationship analysis 130 will be available to any appropriate or authorized user, e.g., domain expert, associated with a given domain 110, 112, and associated with a particular collaborative project being undertaken. In this way, as referenced above, and described in more detail below, a domain expert in the domain 110 may be provided with useful information for creating or updating his or her efforts within the domain 110, in a manner which leverages domain-specific knowledge of the domain 112. Moreover, immediate or concurrent input from a domain expert of the domain 112 is not required, nor is expertise in the domain 112 on the part of the domain expert for the domain 110.

Thus, in various implementations, some of which are discussed below, software development may proceed in different, related manners. For example, a single user developing an application might generate the first assessment 118 in the architecture domain, whereupon the relationship engine 124 may determine related software components in other domains/assessments (e.g., usability or security domains). In response, the user may generate/utilize such related assessments in constructing the application.

In another example, a single user, or two users, might create two different assessments in conjunction with an application being developed, such as the assessments 118, 122. Based on analysis by the relationship engine 124 and the relationship analyzer 128, it may be determined that one or both of the assessments is missing a required or suggested aspect or component, and the developer(s) may then consider adding such aspects/components.

In short, one or more developers may generate one or more assessments, and the previously-determined relationships may be applied to the generated assessment(s), or to new assessments. That is, analysis of the relationships may result in modifications to one or more of the generated assessments, and/or suggestions to add new assessments in other domains. In the latter scenarios, suggestions relevant to a new domain may be made in response to a user's request for such suggestions in conjunction with identifying a specific domain, or may be made automatically by the multi-domain decision manager 102, based on existing relationships between elements of the generated assessment and elements of another domain.

For example, a first developer may generate assessments in an architecture domain and a usability domain. After applying and analyzing any pre-determined, relevant relationships therebetween, new aspects of either or both of the architecture domains may be suggested/required, while new aspects in the security domain also may be suggested/required. In such examples, software architects who are not experts in usability or security may nonetheless develop highly-usable, secure applications, while requiring little or no assistance from experts in those domains.

As referenced above, and taking into account information obtained from the relationships 126 and the relationship analysis 130, a library of assessed, annotated software components 104 may be obtained, e.g., for use in constructing a functional software architecture 106 for the software application being developed. In this regard, it will be appreciated that the concept of the use of discrete software components as "building blocks" to be used in constructing different software applications is widely known. Similarly, the concept of reusing such software components in the context of subsequently-constructed software applications is also generally known.

However, conventional techniques for assembling discrete software components, or subsets thereof, into new or modified software applications, although efficient and practical in theory, often provide unsatisfactory results. For example, software components have various properties, requirements, and/or dependencies, and must be assembled together (and with any newly-created code) in a manner which fulfills necessary requirements and dependencies, and appropriately utilizes available properties and features.

However, it often occurs that a creator or other provider of a given software component will not be the same individual desiring to use the software component at a later time. Indeed, an attractive feature of the use of such software components is the ability to enable potentially non-expert users to utilize the software components and obtain the features and advantages thereof, in a manner that would not otherwise be as available or convenient. Nonetheless, as just referenced, a result of such scenarios is that it is improbably or impossible for the potentially non-expert user to reuse a given software component in a satisfactory or optimal manner.

Moreover, if the user deploys a given software component within the software architecture 106, it may occur at a later time that a vulnerability or other flaw of the software component is discovered, that was not known at the time of its deployment within the software architecture 106. For example, a new type of network attack may be discovered as being applicable to the software component in question. In such scenarios, particularly when the user is not a security expert, it may occur that the deployed software component continues to be deployed and active within the software architecture 106, notwithstanding the potential security vulnerability.

Thus, as referenced above, the component use manager 108 may be configured to interface with the library of annotated software components 104, and with the software architecture 106. In this regard, as also referenced, the software components of the annotated software components 104 should be understood to represent any type of appropriately annotated software component, including, but not limited to, software components that have been annotated in accordance with the assessments 118, 120. For example, the component use manager 108, or a related tool, may be utilized to provide desired annotations to the software components 104, whether such software components result from assessments associated with the assessment engine 116, or not.

In operation, the component use manager 108 may include one or more processors, and associated non-transitory computer-readable storage medium for storing executable instructions thereon, and other suitable hardware/software for implementing the example of FIG. 1. For example, the component use manager 108 may include a component selector 131 that is configured to select one or more components from the library of annotated software components 104. For example, the component selector 131 may be utilized to search for a specific component. In other examples, the component selector 131 may be utilized to identify one or more types or classes of components. For example, when a software developer is in the process of developing a particular application or type of application, the component selector 131 may be configured to search for or otherwise identify particular software components that may be of interest to the developer.

An evaluation engine 132 may be configured to evaluate any selected software component(s), or combinations thereof. For example, the evaluation engine 132 may evaluate benefits and risks (e.g., non-compliance) associated with including a selected component within a particular software application under development, and/or may identify potential additional work that may have to be done to incorporate or fully leverage the selected component.

For example, the evaluation engine 132 may include a property matcher 134 and a requirement detector 136. As referenced above and described in more detail below, the evaluation engine 132 may thus be configured to ensure that requirements of the selected software component, and of the software application being developed (represented by the architecture 106), will be met or considered. Similarly, but conversely, the evaluation engine 132, using the property matcher 134, may be configured to ensure that relevant properties of the selected component are identified and used appropriately, e.g., in conjunction with an associated requirement (e.g., of the application, and/or of a specific software component), or otherwise.

Further in FIG. 1, the component use manager 108 is illustrated as including a component update monitor 138. As referenced above, it may occur that a given component changes over time, and/or that external circumstances occur which may or should cause changes to the software component to be implemented. In order to ensure that such potential changes are identified, and implemented when necessary or desired within the software architecture 106, the component update monitor 138 may maintain a periodic or continual connection with the library of annotated software components 104 and/or the software architecture 106.

For example, the component update monitor 138 may implement a push or a subscription notification system, in which any changes to the software components, or annotations thereof, are automatically forwarded to an appropriate or relevant instance of the component update monitor 138. In other example implementations, the component update monitor 138 may implement a pull mechanism of proactively (e.g., periodically) identifying particular software components that may require updating.

A comparator 140 is configured to access a plurality of update notifications stored within an update notifications repository 141 with software components of the library of annotated software components 104 and/or software components of the software architecture 106. Operations of the comparator 140, including use of the update notifications 141 by the comparator 140, are provided in more detail below in conjunction with FIGS. 5-7. For purposes of understanding operations of the system 100 of FIG. 1, it will be appreciated that the comparator 140 is generally configured to detect inconsistencies between individual ones of the update notifications 141 and individual software components (e.g., or properties or requirements thereof). For example, the update notifications 141 may specify a requirement for a certain type or level of security to be associated with a specific software component, or type of software component, or with the application as a whole. The comparator 140 may thus be configured to detect that a relevant software component does not match or possess the specified security property.

Thus, based on a determination of an update to a software component within the software component library 104, the comparator 140 may determine a nature of the update to related software component(s), and provide a notification of the update in the context of the software architecture 106. By comparing the software component within the software architecture 106 with the updated software component at the software component library 104, a potential change to the software component within the software architecture may be determined, based on the comparison.

In these and similar scenarios, an alert generator 142 may be configured to generate a notification or other alert to the user of the component use manager 108. For example, a software developer may utilize the component use manager 108 to construct a software application, and may then proceed to deploy the software application. After some period of time, the update notifications 141 may be updated to reflect the type of enhanced security requirement that may come into existence subsequent to deployment of the software application. Based on operations of the comparator 140 in determining that a specific, relevant software component or type of software component does not possess a specified security level, the alert generator 142 may send a notification or other alert to the software developer, notifying the software developer of the enhanced security requirement. Although the update notifications 141 are illustrated separately in the example of FIG. 1, it will be appreciated that the update notifications 141 may be stored using other techniques, e.g., may be stored together with the annotated software components 104. Again, additional examples related to operations of the alert generator 142 in the context of the component use manager 108 are provided in more detail below, with respect to FIGS. 5-7.

In general, it will be appreciated that the system 100 of FIG. 1 may be implemented using any appropriate hardware/software platforms. For example, as already referenced, one or both of the multi-domain decision manager 102 and/or the component use manager 108 may be implemented using at least one computing device that includes at least one processor and a non-transitory computer readable storage medium. For example, both the multi-domain decision manager 102 and the component use manager 108 may be implemented as part of a single software development platform. In other implementations, the multi-domain decision manager 102 and the component use manager 108 may be implemented separately and independently.

When implemented together, the multi-domain decision manager 102 and the component use manager 108 may provide complementary, advantageous features. For example, it may occur that a software component is implemented in a given programming language, such as Java, and assessed/annotated accordingly. If the language shifts from Java to C++ at a later time, a relationship analysis by the relationship analyzer 128 may indicate that the component is likely to suffer from a buffer overflow vulnerability (i.e., detected based on a relationship between the "C++" property of the architecture domain and the "buffer overflow" property of the security domain). The component use manager 108 may then detect this change and issue an alert accordingly.

Finally with respect to FIG. 1, it will be appreciated that any single component or sub-component of the system 100 may be implemented using two or more components in communication with one another, e.g., over a computer network. Conversely, any two or more components or sub-components of the system 100 may be configured for operation as a single component.

Figure 2:
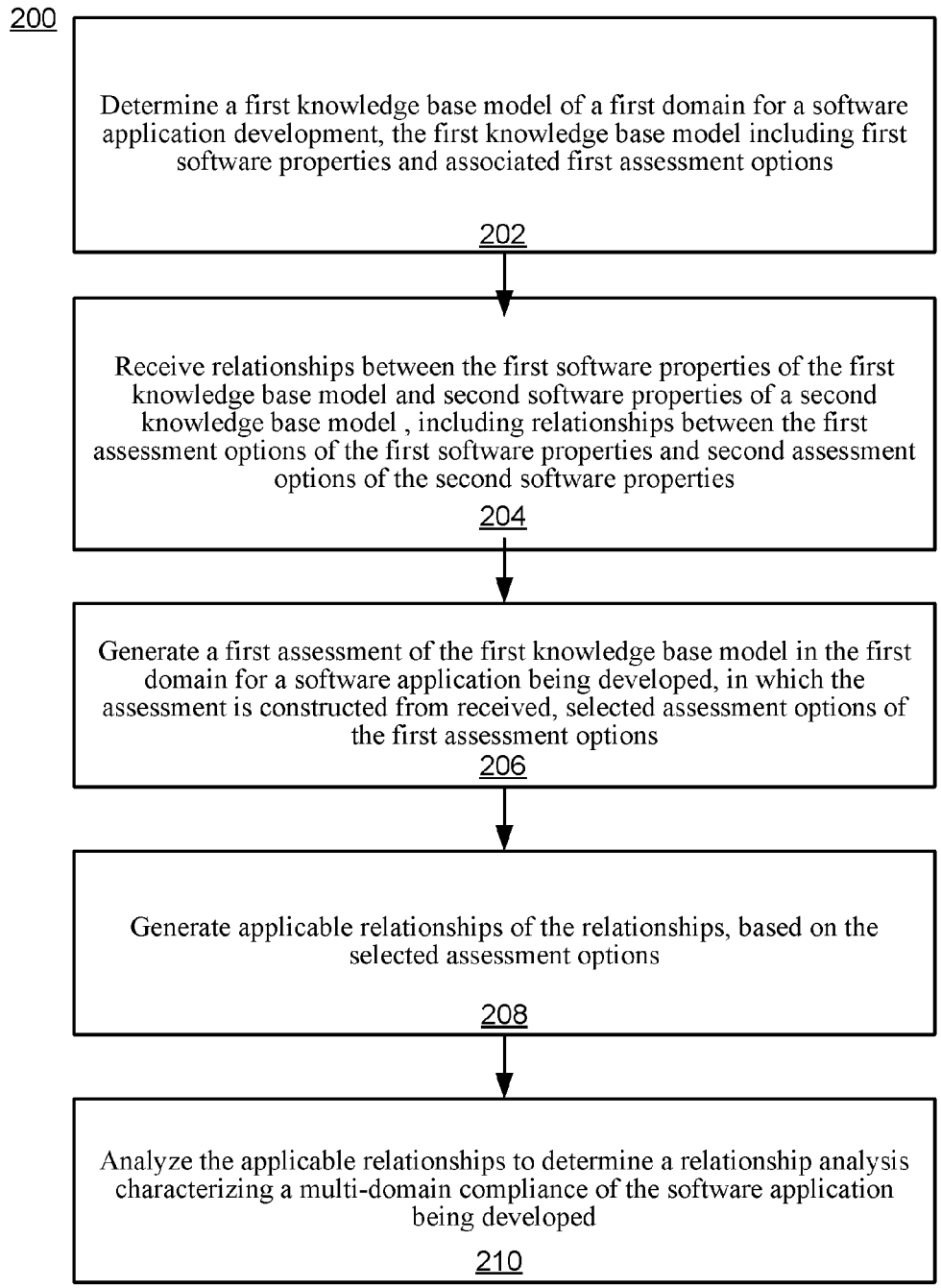
FIG. 2 is a flowchart illustrating example operations of a multi-domain decision manager of FIG. 1.

FIG. 2 is a flowchart 200 illustrating example operations of the system 100 of FIG. 1. In the example of FIG. 2, operations 202-210 are illustrated as separate, sequential operations. However, in various implementations, additional or alternative operations may be included, one or more operations may be omitted, and/or the operations may be performed in a different order than that shown. In all such implementations, any two or more operations or sub-operations may be executed in a partially or completely overlapping or parallel manner, or in a nested, iterative, looped, or branched fashion.

In the example of FIG. 2, a first knowledge base model of a first domain for a software application development is determined, the first knowledge base model including first software properties and associated first assessment options (202). For example, as described with respect to FIG. 1, the assessment engine 116 of the multi-domain decision manager 102 may be configured to access a first knowledge base model 114 of the domain 110. Based on (manually or automatically) selected assessment options associated with one or more software properties of the knowledge base model 114, the assessment 118 may be constructed.

Relationships between the first software properties of the first knowledge base model and second software properties of a second knowledge base model may be received, including relationships between the first assessment options of the first software properties and second assessment options of the second software properties (204). Again, the assessment engine 116 may be understood to provide an example technique for evaluating the knowledge base model 120 of the domain 112, and automatically or manually selecting from among included assessment options to obtain the assessment 122.

A first assessment of the first knowledge base model in the first domain for a software application being developed may be developed, in which the assessment is constructed from received, selected assessment options of the first assessment options (206). For example, the relationship engine 124 may be configured to manually or automatically construct the relationships 126 as including relationships between the knowledge base models 114, 120 (e.g., between individual software components or other software properties thereof).

Applicable relationships of the relationships may be generated, based on the selected assessment options (208). For example, again, the relationship engine 124 may be utilized to construct the relationships 126 as including manually or automatically determined relationships between individual selected assessment options of the assessments 118, 122. In other words, the applicable relationships represent a subset of the relationships that are specific to the assessment being generated and manually or automatically selected domains.

The relationships and the assessment relationships may be analyzed to determine a relationship analysis characterizing a multi-domain compliance of the software application being developed (210). For example, the relationship analyzer 128 of FIG. 1 may be configured to construct the relationship analysis 130 based on a statistical analysis of the relationships 126 (e.g., including analyses in which two or more of the relationships are combined, summed, filtered, prioritized, or counted). For example, in a simplified scenario, it may occur that the relationship analysis 130 indicates that all selected assessment options of the assessment 118 are necessary and sufficient to correspond and comply with all assessment options of the assessment 122, and vice versa. In such cases, current operations of the multi-domain decision manager 102 may be completed with respect to the domains 110, 112 and the associated software application under development, and the annotated software components 104 and the software architecture 106 may subsequently be updated accordingly, utilizing the analyzed assessments 118, 122. Of course, in scenarios in which the relationship analysis 130 indicates that the selected assessment options of the assessment 118 may not provide necessary or sufficient levels of compliance with assessment options of the assessment 122 (or vice versa), then the multi-domain decision manager 102 may be configured to proceed with subsequent, further updates to the assessments 118 and/or 122, including updates to the relationships 126 and the relationship analysis 130. Then, associated revisions of the assessments 118 and/or 122 may be conducted until the required multi-domain compliance levels have been achieved.

Figure 3:
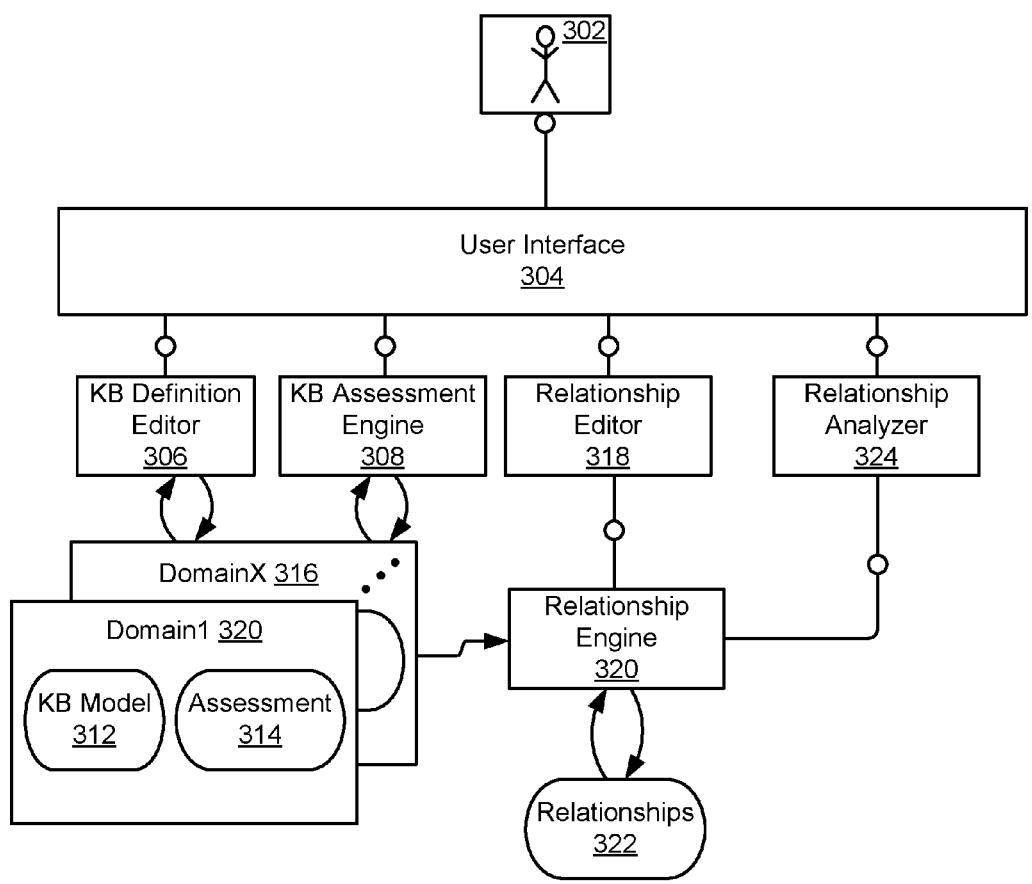
FIG. 3 is a block diagram of a system architecture illustrating an example implementation of the multi-domain decision manager of FIG. 1.

FIG. 3 is a block diagram of a system 300 illustrating an example implementation of the system 100 of FIG. 1. Thus, as described, FIG. 3 also provides techniques for utilizing relationship types to characterize relationships between multiple domains, so that analysis of the relationships may be used to provide meta-information identifying causes, effects, and requirements across the multiple domains.

In the example of FIG. 3, a user 302 represents a plurality of potential users of the system 300, where the potential users have different roles, and may interact with the system 300 at different times within a relevant timeframe. For example, as may be appreciated from the above description, a first time window might be defined during which multi-domain information is defined and created, and a second time window might occur during which the multi-domain relationships are defined and created. A third time window might include a time in which analysis of the relationships occurs. Of course, these time windows may occur in a parallel or overlapping manner, with each other, as well as with an overall, related software development life cycle.

Thus, in related implementations, the user 302 may represent multiple experts involved in the software development project. For example, as referenced, a product owner may be assigned with managing functional requirements of a software application being developed, as an expert in a functional domain. A software architect, or architect, may be an expert in designing an application (e.g., application architecture) that fulfills the functional requirements set forth by the product owner, and may thus represent an expert in a technical and/or integration domain. The user 302 may also represent the type of security expert referenced above, as an expert in the security domain who is charged with, e.g., checking and analyzing whether the designed architecture fulfills necessary security requirements. As already referenced, the user 302 also may represent experts in non-functional domains, such as application design or usability, performance, or quality/reliability domains.

As also referenced above, and described in detail below, overall software development occurs during a project life cycle, with the various phases of the software development often occurring in a generally sequential manner. For example, the software architect may construct the architecture prior to involvement of the security expert. In such cases, changes required by the security expert may be problematic to implement within the already-architected software application (e.g., may require significant reworking of aspects of the designed architecture). In contrast, using the system of FIG. 3, the architect is provided with an ability to analyze impacts of design decisions with respect to security concerns during the earlier design phase, thereby improving the overall development workflow, and increasing a timeliness, efficiency, and overall quality of the software development efforts.

In the example of FIG. 3, a user interface 304 represents one or more user interfaces designed to provide the user 302 with access to the various features and functions of the system 300 described herein. For example, a knowledge base definition editor 306 enables domain experts to provide their expertise in defining and otherwise characterizing domain-specific information in an intuitive, graphical manner. Meanwhile, a knowledge base assessment engine 308 enables another user 302, who may be a non-expert with respect to the domain-specific knowledge provided using the knowledge base definition editor 306, to nonetheless leverage the domain-specific information provided by the knowledge base definition editor 306 to create specific assessments required for a current software development project. Thus, for a first domain 310, e.g., an architecture domain, the knowledge base definition editor 306 may be utilized by an architecture expert to create a knowledge base model 312 characterizing, in this example, information that would be relevant to, or expected from, a software architect.

As referenced above, the knowledge base model 312 may be stored using any appropriate memory or data storage component, and generally represents structured data for the relevant domain. Generally, any appropriate data structure may be used. For example, a hierarchical or tree structure may be used in which more general topics are structured in parent-child relationships with more specific versions or aspects thereof. In the example, information stored in the knowledge base model 312 and expected from the user 302 representing the software architect, may include front-end technology, back-end technology, and other architectural aspects. Then, the knowledge base assessment engine 308 may later be used in conjunction with the knowledge base model 312 to create a corresponding assessment 314. That is, as described above, the assessment 314 may be understood to represent an instance of the knowledge base model 312 that is created with respect to, in this example, a specific software development project.

Thus, in this aspect of the example, the user 302 may be understood to represent a same or different user fulfilling an architecture-related role. For example, a first user may be an expert in software architecture who uses the knowledge base definition editor 306 to create the knowledge base model 312. Meanwhile, a second user may be a second architect, who may not be as experienced or knowledgeable as the first, expert user, but who is involved in a particular software development project for which the assessment 314 is required.

In operation, then, the user 302 in this context may utilize appropriate portions of the user interface 304 to access the knowledge base assessment engine 308 and create the assessment 314 within the domain 310 from the knowledge base model 312. For example, as referenced above, the knowledge base model 312 may include structured information related to front-end technology, and the assessment 314 may include an instance in which hypertext markup language (HTML) is selected by the user 302 using the knowledge base assessment engine 308 as the desired instantiation of the front-end technology. As with the knowledge base model 312, the assessment 314 thus represents structured data that may be stored in any appropriate memory or data storage component.

Continuing the example, the domain 316 may represent a security domain. Although not specifically illustrated in the example of FIG. 3, it will be appreciated that the security domain 316 will also include a knowledge base model in which structured data related to security vulnerabilities, requirements, and other concerns may be stored. For example, the security domain 316 may include a knowledge base model that specifies various security requirements, perhaps in relation to one another. For example, a security requirement "X" may be that an application is free of a specific threat, such as cross site scripting (XSS), or a separate security requirement "Y" that an application should be free of a different type of vulnerability, e.g., buffered overflow vulnerabilities.

As with the domain 310, a security expert represented by the user 302 may use the knowledge base definition editor 306 to create the knowledge base model of the domain 316. Then, a same or different user represented by the user 302 may utilize the knowledge base assessment engine 308 to create an assessment instantiated from the knowledge base model of the domain 316.

Meanwhile, a relationship editor 318 represents a tool that may be used for editing relationships between the domains 310, 316. For example, the relationship editor 318 may be accessed by way of the user interface 304 to control operations of a relationship engine 320, corresponding generally to the relationship engine 124 of FIG. 1.

The relationship engine 320 may be configured, for example, to load knowledge base models of relevant domains. The relationship engine 320 also may be used to create or edit relationships between knowledge base models of different domains, or between assessments of different domains. Further, the relationship engine 320, by way of the relationship editor 318, may be configured to create or edit a specific relationship type, as referenced above with respect to FIG. 1 and described in more detail below with respect to FIG. 4. As also illustrated in FIG. 3, relationships 322 created by the relationship engine 320 may be stored using any appropriate memory or data storage component.

Finally in the example of FIG. 3, a relationship analyzer 324, corresponding generally to the relationship analyzer 128 of FIG. 1, represents a tool configured to analyze and characterize relationships between two or more domains. More specifically, for example, the relationship analyzer 324 may be configured to provide statistical information regarding relevant, identified relationships between two or more domains, based on the specific subsets and combinations of relationship types that have been created with respect to two or more specific domains through the use of the relationship editor 318, and the relationship engine 320. Also with respect to the relationship analyzer 324, the relationship analyzer 324 may be configured to enable the user 302 to drill down into a single, selected domain, e.g., for purposes of deciding whether some information within the assessment of that domain should be changed.

In operation, the relationship analyzer 324 may utilize the relationship engine 320 to access and load knowledge base models and assessments of domains for which relationships are being analyzed. The relationship analyzer 324 may also utilize the relationship engine 320 to load associated relationships 322. The relationship analyzer 324 also may interact with the relationship engine 320 to filter loaded assessments, based on relationship types.

Figure 4:
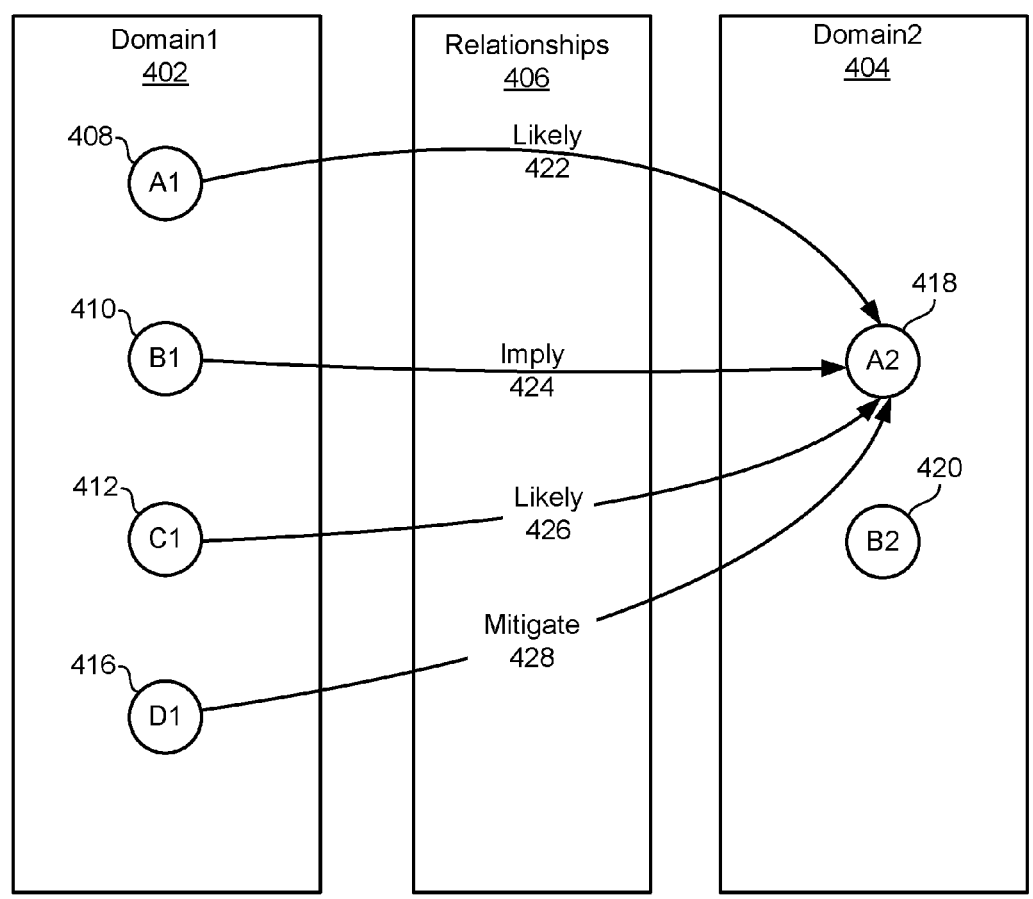
FIG. 4 is a block diagram illustrating relationship types established among two or more domains, using the techniques of FIGS. 1-3.

FIG. 4 is a block diagram illustrating example relationships between domains. In the example of FIG. 4, a first domain 402 is illustrated in conjunction with a second domain 404, and connected thereto by way of intervening, connecting relationships 406.

As shown, the first domain 402 includes a plurality of components 408, 410, 412, and 416. Meanwhile, the second domain 404 includes a first component 418 and a second component 420. As further illustrated, the relationships 406 include specific relationships 422, 424, 426, and 428. More specifically, as illustrated in the simplified example of FIG. 4, the four relationships 422, 424, 426, 428 each link corresponding, respective components 408, 410, 412, 416 of the first domain 402 to the single component 418 of the second domain 404.

As may be appreciated from the above description, the relationships 422-428 may of various relationship types. For example, the relationships 422, 426 are illustrated as being of the relationship type "likely." A specific definition of the relationship type "likely" may be created and defined through the use of the relationship editor 318 and the relationship engine 320, as described above. For purposes of description of FIG. 4, however, it will be appreciated that the relationship type "likely" simply means that a presence of the component 408 in the first domain 402 means that it is likely that the component 418 will be required within the second domain 404.

In this regard, it will be appreciated that the various relationship types may be defined for implementation on a component-by-component basis, with the expectation that a corresponding relationship will be created between two specific components, that may be independent of other potential relationship types and relationships assigned to other pairs of components. Then, it is the job of the relationship analyzer 324 to analyze the entire group of the relationships 406, or subsets thereof, in order to provide statistical, meaningful information regarding decisions to be made and actions to be taken with respect to the software development project being implemented.

For example, as referenced above, the relationship type "likely" may be defined to refer to scenarios in which common architecture flaws lead to specific, associated security vulnerabilities. In other words, in such scenarios, it is possible that a skilled architect may create a version of a component that does not suffer from the potential vulnerability associated with a specific security component, while less skilled architects may design and implement software code in a manner that is susceptible to the same security vulnerability. Therefore, in the general sense, the relationship type "likely" simply means that, in general, it is likely that the specified software component will be vulnerable to the related security requirement/vulnerability.

For example, continuing the example above, if the first domain 402 represents an architecture domain in which the knowledge base model requires definition of a back-end technology, and a corresponding assessment instantiates the back-end technology using the C/C++ programming languages, and in which a security requirement "Y" specifies that the application should be free of buffer overflow vulnerabilities, then the relationship type "likely" may be applicable. That is, if properly developed in C/C++, an application may be unlikely to suffer from the buffer overflow vulnerability, while the user 302 in the role of assigning relationships may believe that, in the aggregate, relevant software architects developing software application using the systems 100/300 may be more likely than not to fail to provide such proper development of the back-end technology of the application using C/C++. Thus, from this example, it is apparent that the relationship type "likely" may be a relative term, so that what is considered likely in one context for one group of architects may not be likely for another context and another group of architects.

To provide other examples of relationships, the relationship 424 illustrates a relationship type "imply" while the relationship 428 illustrates a relationship type "mitigate." For example, the relationship type "imply" may be understood to represent a stronger or more necessary or causative relationship between related component pairs than the relationship type "likely." That is, for example, the relationship type "likely" may be dependent on the context of implementation, while the relationship type "imply" may be more structurally rooted in a nature of the component pairs being related. Meanwhile, the relationship type "mitigate" of the relationship 428 may be defined to provide an indication that a presence of the first related component 416 of the first domain 402 renders a presence of, or requirement for, the second related component 418 to be less likely within the second domain 404.

In the example of FIG. 4, consistent with the above description, the components 408-416 of the first domain 402 and the components 418, 420 of the second domain 404 may represent any components from their respective domains. That is, for example, the various components may be identified at a level of a knowledge base model, or may be identified at a level of a corresponding assessment. For example, relationships of various relationship types may be formed between pairs of knowledge base model components, while other relationships, of the same or different relationship type, may be formed between assessment components.

The relationship analyzer 324 thus inputs the various relationships 406 and analyzes the relationships 406 in the aggregate. To provide a few simplified examples, the relationship analyzer 324 may consider groups of component pairs and relationships of the same type, and quantify an extent to which a presence of a plurality of relationship types of the same type increase a need for the inclusion of one or more specified components. For example, the relationship analyzer 324 may consider that a presence of the relationship 422 indicating a likely presence of the component 418, based on a presence of the component 408, should be considered together with the relationship 426, which also indicates a likelihood for inclusion of the component 418, based on presence of the separate component 412. In other words, the component 418 is in fact more likely to appear within the second domain 404 in the example of FIG. 4 than it would be if either of the relationships 422, 426 was not present.

Other relationship types may have superseding interactions there between. For example, if the relationship type "imply" is considered a stronger version of the relationship type "likely," then decisions on whether the component 418 should be included within the second domain 404 may be dictated largely or completely by the relationship 424 than by either or both of the relationships 422, 426.

Meanwhile, the relationship 428 illustrates and represents a variety of possible negating relationship types, in which the presence of the component 416 is correlated with, or causative of, omission or lack of inclusion of the component 418. As with the examples given above with respect to the relation types "likely" and "imply," there may be varying degrees of negation (e.g., an absolute requirement for omission of a given component in one domain and in the presence of a related component in the other domain, or some lesser extent of negation).

In practice, of course, software development projects may be extremely large and extensive, and may contain a huge number of components within multiple domains. Consequently, the number of relationships and number of relationship types also may be extensive. The relationship analyzer 324, as described, may provide a detailed, quantifiable, statistical or probabilistic analysis of even large numbers of relationships and relationship types (and associated domains), so as to provide a useful basis for decision making by the various users of the systems 100/300.

For example, if the systems 100/300 determine that the presence of a front-end requirement of HTML is likely to lead to a threat of cross site scripting, then the software development may proceed at the design phase to incorporate protections against cross site scripting, which may include implementation decisions with respect to the HTML itself. In this way, such implementation decisions may be taken early in the software development life cycle, and the resulting software application may be developed quickly and efficiently, while maintaining desired security levels.

Figure 5:
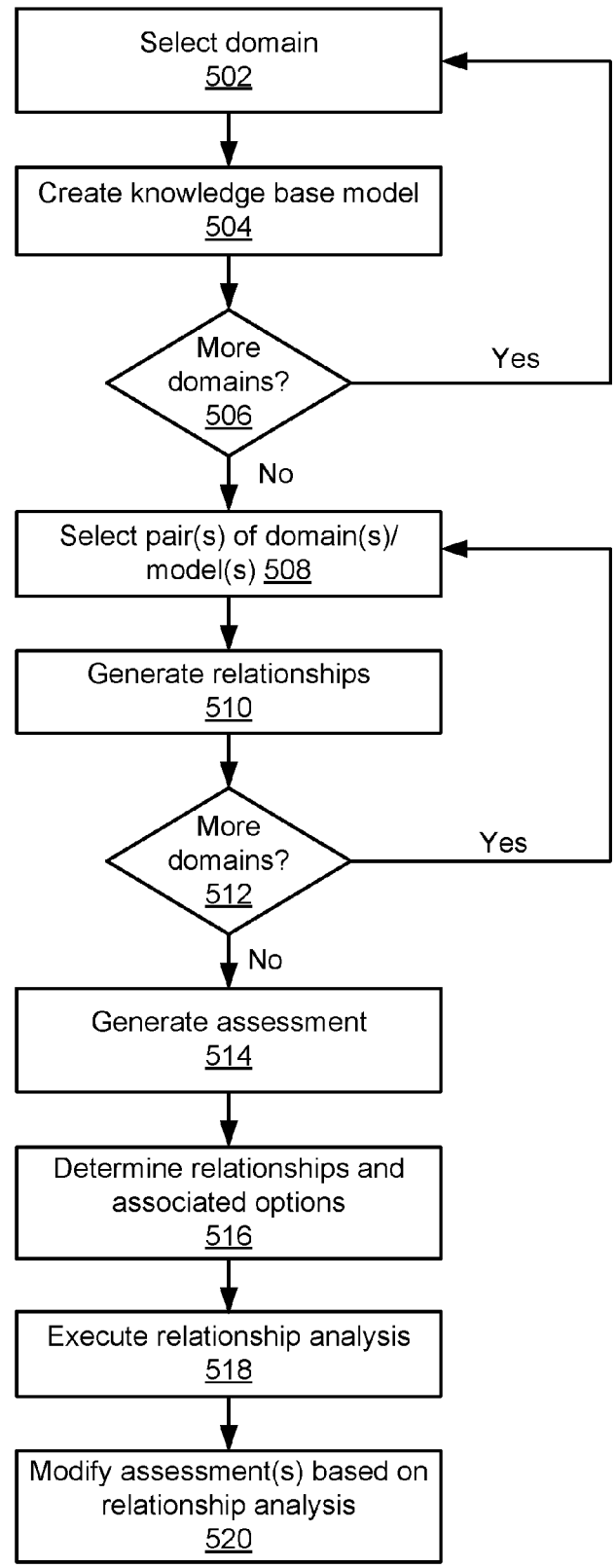
FIG. 5 is a flowchart illustrating more detailed example operations of the system of FIG. 1, in the context of the example implementations of FIGS. 3 and 4.

FIG. 5 is a flowchart 500 illustrating more detailed example operations of the systems 100 and 300 of FIGS. 1 and 3, respectively. In the example of FIG. 5, references are made to the implementation of FIG. 3; however, it will be appreciated that the flowchart 500 may be implemented using the system 100 of FIG. 1, or other variations or implementations thereof.

At a beginning of operations of the flowchart 500, it is assumed that the system 300 is in an initialized state, and is not yet been configured with respect to the various features and functions described herein. Therefore, operations may begin with an expert in a particular domain creating or selecting any initialized domain (502), and then proceeding to create a corresponding knowledge base model (504). If more domains are required (506), then operations 502, 504 may continue. In short, as described, various domain experts represented by the single illustrated user 302 may utilize the user interface 304 to access the knowledge base definition editor 306 and create the various domains 310, 316 and associated knowledge base models (e.g., the knowledge base model 312).

Once all domains have been defined with their associated knowledge base models (506), a first pair of these domains may then be selected (508) for generation of relationships therebetween (510). For example, continuing the example above, a first domain for software architecture may include a knowledge base model that includes a requirement for a front-end technology and a back-end technology. A second domain may include a security domain in which a knowledge base model specifies a security requirement of being free of cross site scripting, and a second security requirement of being free of buffer overflow vulnerabilities.

Thus, if the architecture/security domains are selected for relationship generation, then relationships between properties, and/or between associated assessment options, may be determined and stored in conjunction with either/both of the architecture/security domains, or any related pair of properties/assessment options. For example, as described, the knowledge base model component of "front-end technology" may be associated with a plurality of front-end technology selection choices (e.g., HTML, HTML5, Java, WebDynpro), while a "back-end technology" property might include a selection choice of C/C++ for a programming platform to implement the back-end technology. Continuing the example above, a security requirement "X" specified within the corresponding knowledge base model may include an option of "free from cross site scripting." Similarly, a security requirement "Y" may include an assessment option "free of buffer overflow vulnerabilities."

In example implementations for generating the relationships, the relationship editor 318 may be accessed by an appropriate user 302 to cause the relationship engine 320 to construct the relationships 322 at a level of the pairs of knowledge base models. For example, it may occur that any software application with front-end technology associated with any of the potential assessment options will have some relationship with a corresponding security requirement of the security domain, without necessarily knowing what the instantiation of that security requirement will be.

Similarly, assessment level relationships may be generated. Again, such relationships may be created between assessment components of the pair of relevant domains. For example, as may be understood with reference to the example of FIG. 4, the assessment option of HTML for the front-end technology may be related in a "likely" relationship type with the assessment option for (protection against) cross site scripting in the security domain. Similarly, the assessment option C/C++ in the assessment of the architecture domain may be assigned a relationship type of "likely" with the assessment component of (protection against) buffer overflow vulnerability in the security domain.

Once the relationships have been generated/selected and stored for all pairs of domains (512), a corresponding assessment may be generated (514). For example, a software architect represented by the user 302 of FIG. 3 may utilize the assessment engine 308 to interact with the knowledge base model 312 and create the assessment 314. For example, the user interface 304 may provide a selection wizard, question/answer format, or other appropriate format for presenting the user 302 (representing a software architect creating a software application) with the various knowledge base model components and associated assessment options.

Then, the relevant relationships may be determined, e.g., retrieved from memory based on the selected assessment options (516). For example, a property-level relationship may be determined (e.g., retrieved) between a property in the first domain from which assessment options were chosen and a property in a second domain. Similarly, an assessment-level relationship may be determined between a selected assessment option and a corresponding assessment option of a second domain (e.g., between the selected assessment option of "HTML" and a corresponding security requirement for protecting against cross site scripting).

Once all relationships have been determined, relationship analysis may be executed (518). For example, the relationship analyzer 324 may proceed to analyze the various relationships between the various pairs of domains in the aggregate, performing statistical analysis on the various relationships, or subsets thereof, based on which relationships are present, and based on definitions of the relationships and rules for analyzing their relationships with respect to one another.

It will be appreciated that all available relationships between all available model level components and assessment level components may be pre-formulated and assigned, prior to implementation of a particular software development project. For example, a given knowledge base model component may have two assessment options from which to select in a given domain, while a knowledge base model in a second domain may have a pair of potential assessment options as well. Relationships between the knowledge base model components and between both of the assessment options in both domains may be created prior to the generation of a particular assessment. Thus, regardless of which assessment options are selected for a particular assessment at a time of its creation/instantiation, available and relevant relationship types and relationships will already have been defined, and can simply be determined by being retrieved from the relationships 322.

Put another way, available property relationships between property pairs of software properties of a first knowledge base model and the software properties of a second knowledge base model may be stored prior to development of a software application being developed, so that property relationships may be automatically selected from among the available property relationships, based on selected assessment options. Similarly, assessment relationships between assessment pairs of assessment options may be stored prior to development of a software application being developed, so that assessment relationships may be automatically selected from among the available assessment relationships, based on selected assessment options.

Once the relationship analysis has been performed, then relationship analysis results may be provided to the relevant users, who may then modify relevant assessments based thereon (520). For example, where the user 302 represents a software architect, user 302 may be provided with information regarding a level of need for inclusion of a particular security component, which the architect in question may not have previously considered for inclusion. In other examples, the relationship analysis results may indicate to the software architect that a security component that was included may in fact not be necessary, due to a presence of some other, superseding security component. As referenced above, the relationship analysis results will be sufficiently specific to provide concrete guidance for decisions of the software architect in these regards.

Thus, the systems of FIGS. 1 and 3 are capable of, for example, suggesting a possible need for a change of selected assessment options, based on the relationship analysis. Further, the systems of FIGS. 1 and 3 are capable of, for example, suggesting a possible need for an addition of an additional software property, based on the relationship analysis (and determining an additional property relationship, based on the addition, if needed), or, similarly, suggesting a possible need for an addition of an additional assessment option, based on the relationship analysis (and, again, determinng an additional assessment relationship, based on the addition). As described, these and other features may be enabled through the performing of an aggregated statistical analysis characterizing a cumulative impact of all selected property relationships and assessment relationships on the software application being developed.

Thus, the systems and methods, and associated features and functions, of FIGS. 1-5 provide a capability of analyzing data across domains, using relationships of various relationship types between data components of the different domains. The techniques utilize structured or semi-structured data to create such relationships, without requiring semantic, ontological, or other inherent correlations. Further, the relationship analysis provided provides the relationship analysis results without requiring common data fields, such as foreign keys. Instead, as described, the various relationships, and relationships between the relationships, are defined, assigned, and analyzed across heterogeneous domains, and provide useful decision making guidance across the domains.

FIG. 6 is a flowchart 600 illustrating example operations of the component use manager 108 of FIG. 1. In the example of FIG. 6, operations 602-608 are illustrated as separate, sequential operations. In various implementations, however, additional or alternative operations or sub-operations may be included, one or more operations or sub-operations may be omitted, and/or the various operations or sub-operations may be executed in a different order than that shown. In all such implementations, additional or alternative operations or sub-operations may be included, and in the various implementations, the operations or sub-operations may be executed in a partially or completely overlapping or parallel manner, or in a nested, iterative, looped, or branched fashion.

With respect to FIG. 6, and with reference to the component use manager 108 as described above with respect to FIG. 1, a software development life cycle typically includes operations such as defining functional requirements for software being developed, design and implementation of the software to fulfill the specified requirements (including any necessary or desired security, performance, or reliability concerns), as well as subsequent support, maintenance, and upgrading operations. As also referenced, many software applications are constructed using at least some existing software components, which themselves may have undergone all previously-specified software development life cycle operations, including artifacts documenting activities performed by the various software developers with respect thereto.

In practice, however, improvements obtained in terms of development time and cost may be partially or completely offset by potential incompatibilities between the existing, re-used software components and other aspects of the software application being constructed (where such incompatibilities may occur either at a time of creation of the new software application, or during later operational phases of the software application). For example, the component use manager 108 may be configured to consider new application requirements that may arise during the last software development life cycle in a systematic way, so as to ensure requirement compliance between the software application being developed and the various re-used components included therein, while also providing a feedback mechanism between the component use manager 108 and the annotated software components 104 (e.g., using the update notifications 141 of FIG. 1).

In the example of FIG. 6, a first software component previously created for use in a previous software application is determined, the first software component being stored in the software component library in conjunction with the first annotation characterizing a first property of the first software component, wherein the first annotation is linked to a second annotation of a second software component (602). For example, with reference to FIG. 1, such a first software component may be stored within the annotated software components 104, and may be selected by the component selector 131 for potential inclusion within the software architecture 106. For example, the first annotation may be linked to the second annotation, based on a semantic link there between.

A current software application under development may be determined (604). For example, the evaluation engine 132 may receive a designation of an architectural diagram representing the software architecture 106, by way of an appropriate diagram editor, as described in detail below with respect to FIGS. 7 and 8.

Compliance of the first software component with the second software component may be verified, based on the link between the first annotation and the second annotation (606). The evaluation engine 132 may consider any properties, requirements, or other aspects of the first annotation, relative to corresponding properties, requirements, or other aspects of the second software component, or of the software architecture as a whole. For example, as described in more detail below, such compliance may include verification of a sufficiently secure cryptographic algorithm designated for maintaining security of a software component annotated as including personal data.

The first software component and the second software component may be included within the current software application, based on the compliance (608). For example, the diagram editor referenced above and described in detail below, or other appropriate tool, may be utilized to update the software architecture 106 to include both the first component and the second component.

Thus, FIG. 6 provides a high level view of example features and functions of the component use manager 108. Of course, the component use manager 108 may be configured to provide additional or alternative features and functions. For example, with respect to ensuring compliance of multiple software components within the software architecture 106, the component use manager 108 may identify additional software components (e.g., a third software component) that should or must be required within the software architecture 106, for example, based on a requirement of one or both of the first and second software components within the software architecture 106. More specifically, the evaluation engine 132 may utilize a link between the first annotation of the first software component and a third annotation of the third software component.

Further, it will be appreciated that reference to inclusion of software components from the software component library of annotated software components 104 within the software architecture 106 is used in the conventional sense of including instances of the various software components within the software architecture 106. That is, for example, a given software component stored within the annotated software components 104 may be instantiated for use within multiple software architectures. Of course, each such instance may be verified for compliance within its corresponding software architecture by the evaluation engine 132.

Moreover, as referenced above with respect to FIG. 1, the component update monitor 138 may be configured to make comparisons, using the comparator 140, between a given instance of a software component and its parent software component stored within the annotated software components 104, e.g., based on a corresponding update notification of the update notifications 141. If determined to be necessary by the comparator 140, the alert generator 142 may be configured to generate an alert with respect to the software architecture 106, so as to indicate that the utilized instance of the software component in question may need to be updated or otherwise modified.

Figure 7:
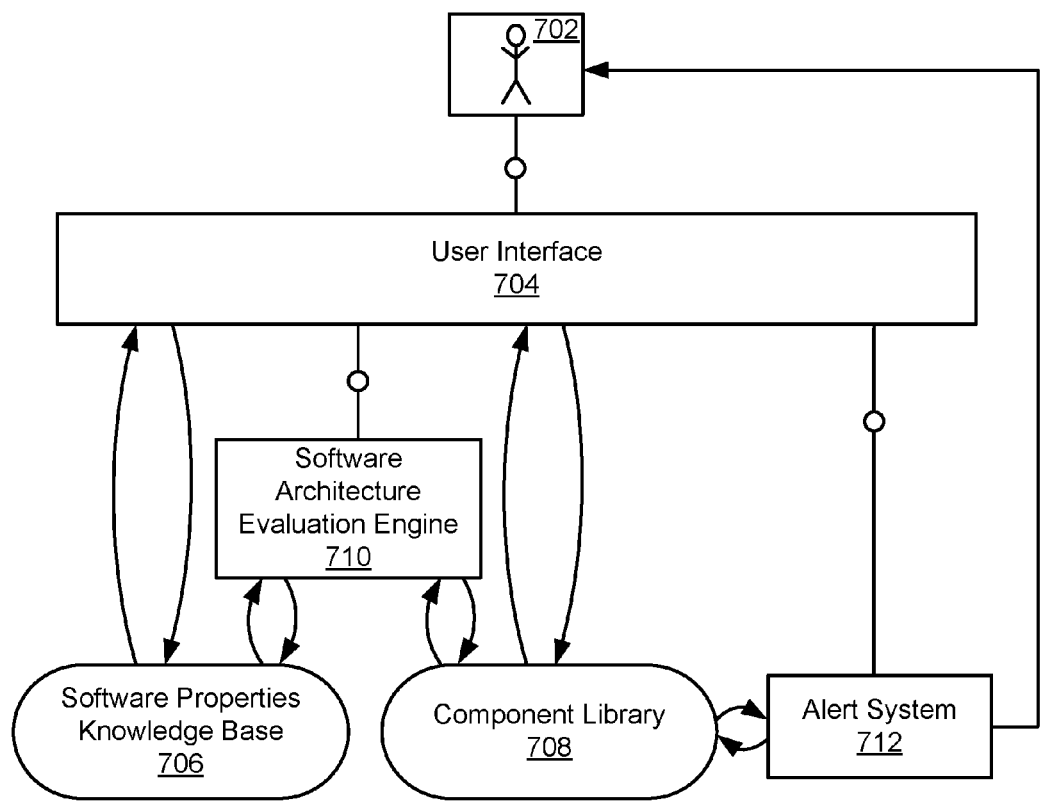
FIG. 7 is a block diagram of a system architecture implementing the component use manager of FIG. 1.

FIG. 7 is a block diagram of a system 700 illustrating more detailed example implementations of the component use manager 108, and associated context. In the example of FIG. 7, a user 702 may represent, e.g., one or more software developers of varying levels and types of expertise. A user interface 704 may be configured to provide the user 702 with an access and ability to utilize features and functions of the component use manager 108, as implemented in the example of FIG. 7.

For example, as shown in FIG. 7, a software annotations knowledge base 706 may be configured to store all available annotations that may be used in conjunction with characterizing a given software component. For example, a given software component, or type of software component, may be associated with a set of individual annotations, including, e.g., one or more properties, requirements, or dependencies of the software component or type of software component in question. Each software component may be associated with a corresponding set or sets of available annotations.

Thus, for example, the user 702 may utilize annotations from the software annotations knowledge base 706 for characterizing individual components to be stored within a component library 708. For example, with respect to a given software component of the component library 708, the user interface 704 may be utilized to display available assessments corresponding thereto. For example, questionnaires may be used throughout a software development life cycle to annotate specific annotations to corresponding software components. For example, requirements-related questions may be answered in a requirement definition phase, while design-related questions may be answered during the design phase, and so on throughout the software development life cycle, so that a given software component is ultimately annotated with all available and/or necessary annotations. In example implementations, the software architecture 106 displayed in diagram form using the user interface 704 may include the various selected/imported software components from the component library 708. Then, annotations may be added by selecting individual ones of the displayed software components.

More generally, it will be appreciated that the user interface 704 may be configured to facilitate the various operations described herein with respect to the component use manager 108. For example, the user interface 704 may be configured to instruct the component library 708 to store the various software components and all associated annotations, as collected from the various questionnaires answered by the software development life cycle actors represented by the user 702. Then, the component library 708 may serve as a central repository from which various users represented by the user 702 may import software components for construction of software architectures, such as the software architecture 706.

When importing software components into the software architectures, the annotations associated with the imported software components are also obtained. These annotations, and associated properties, requirements, or dependencies, may thus be used, e.g., to fulfill existing requirements of the associated application as a whole, or sets of software components thereof, or individual software components thereof. The imported software components and associated annotations also may create new requirements that should or must be handled in the context of the software architecture 106 being developed. As such, it will be appreciated that information introduced in the various phases of the software development life cycle that have already been completed will permit prediction of current and future requirements for used software applications under development.

The software architecture evaluation engine 710 may be configured to verify compliance in the context of a given software architecture, such as the software architecture 106. In order to do so, the evaluation engine 710 may be configured to utilize two sets of data, both of which may be stored using, or derived from, the software annotations knowledge base 706. Specifically, the evaluation engine 710 may be configured to examine the various annotations of the relevant software components, as well as the links between the annotations. Through utilization of the links, representing relationships between the annotations, the evaluation engine 710 may be configured to match defined properties and detect requirements that have not yet been considered and handled within the software architecture 106 in question. In example implementations, the architecture evaluation engine 710 also may provide a list of fulfilled requirements, along with properties that handle these requirements.

In example implementations, the evaluation engine 710 is configured to check for property compliance in the context of a given software architecture. In order to do so, the evaluation engine relies in two sets of data: properties associated to software components and relationship between properties, extracted from the software properties knowledge base 706.

By relying on this property relationship data, the evaluation engine 710 can match defined properties and detect a list of requirements that were not handled in the software architecture. A secondary output may include fulfilled requirements along with properties that handle these requirements. A possible pseudo-code to implement this check is illustrated below, in Pseudocode 1:

---
Pseudo code 1
---
Begin
    For every application requirement Do
        Search for property in software architecture that fulfill requirement
            If property not found
                Add requirement to the list
            End if
    End For
    For every software component Do
        For every required property of software component Do
            Search for property in software architecture that fulfill requirement
            If property not found
                Add requirement to the list
            End if
        End For
    End For
End

---

Further operations of the evaluation engine 710 are provided below, with respect to FIG. 8.

Finally in the example of FIG. 7, an alert system 712 represents the alert generator 142 and associated functionality of the component use manager 108 of FIG. 1. In particular, the alert system 712 of FIG. 7 represents an automated mechanism that enables notification of the user 702 whenever imported software components have associated annotations altered.

More specifically, in operation, whenever a software component is imported into a given software architecture diagram, a reference between the destination software architecture and the component within the component library 708 is stored. Then, the alert system 712 may be configured to locate and identify related software components, and raise alerts for such software components. In this way, the user 702 may be alerted that a revaluation of a relevant software architecture may be required.

For example, if the modifications to the underlying software component are determined not to impact the software architecture, e.g., if no link or relationship between affected properties and properties defined for the system exist, then no further action may be required by the user 702. On the other hand, if the modification impacts the software architecture, such as when a relationship exists between an affected property and defined system properties, then action may be required. For example, if a new requirement has been included, or if a fulfillment of an existing requirement is no longer valid, then it may be necessary for the user 702 to restart the architecture definition and evaluation process.

Figure 8:
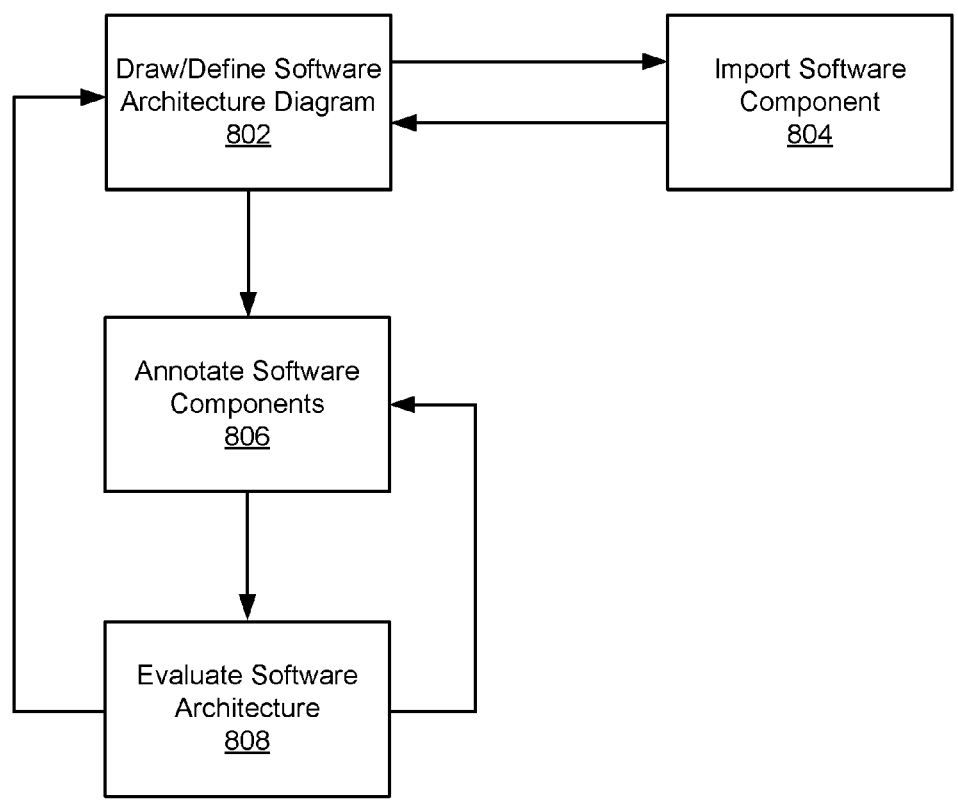
FIG. 8 is a flowchart illustrating more detailed example operations of the component use manager of FIGS. 1 and 7.

FIG. 8 is a flowchart 800 illustrating example operations of the system 700 of FIG. 7. In the example of FIG. 8, a software architecture diagram is drawn and/or defined (802). For example, as referenced above, the user interface 704 of FIG. 7 may provide a diagram editor, text-based user interface, or other appropriate user interface for constructing and utilizing a software architecture. That is, a graphical interface such as an architecture diagram editor provides for visualization of software components and connections therebetween, as well as a straightforward medium for designing/defining software architecture, importing software components, annotating software components and triggering evaluations of software components. Nonetheless, all of these actions and related actions also may be executed using a text-based user interface.

In the example of FIG. 8, software components of the constructed software architecture diagram may be annotated (804). For example, in some implementations, the multi-domain decision manager 102 of FIG. 1 may be utilized to implement the assessment processes described therein, in order to obtain appropriate annotations for included software components. In other example implementations, the graphical user interface 704 may be utilized to provide annotations directly. Additionally, or alternatively, as referenced above with respect to FIG. 7, the software annotations knowledge base 706 may be utilized to provide all available annotations for specific software components.

Thus, in general, the various annotations may range from simple technical details (e.g., a type of programming language or libraries used by a corresponding software component), requirements such as whether a given software component requires data to be validated at a particular time or in a particular manner, configuration requirements (e.g., how a firewall should be configured, or which encryption algorithm should be utilized), or various other types of detailed properties (e.g., whether multi tenancy is supported, types of data that are stored, or techniques for associated data storage).

In the example of FIG. 7, as already referenced, the software annotations knowledge base 706 may be defined beforehand and stored for future use, including identification and definition of semantic relationships linking specific annotations. For example, it may occur that a first annotation includes a property A that defines different cryptographic algorithms, such as A1=512 bits RSA, A2=1024 bits RSA, A3=2048 bits RSA. The property B may be used to define whether an algorithm is secure (e.g., B1=not secure, B2=secure). C1 may be defined as a requirement requiring that an application storing personal data requires secure data storage.

Then, a link between two properties, such as a link between the property A3 and B2, will define whether a given algorithm is considered to be secure or not. Similarly, a link between an application property defining a software requirement C1 will be fulfilled if and only if property B2 is present. In the latter example, a further requirement for a property A3 or other appropriate cryptographic algorithms may be defined.

As already described above, in addition to annotating software components included within the software architecture being constructed, existing, annotated software components may be imported (804) for use within the software architecture diagram. That is, the user 702 may import existing software components and associated annotations from the appropriate component library 708. In so doing, user 702 also may be provided with a subscription for receiving modifications performed in the context of the imported software components.

In example implementations, the imported software components may be specified as standard components, for which properties are relevant in the context of the software component itself. For example, properties of a standard software component will not generally impact the overall software architecture. For instance, even if a database is an important functional element, its properties (e.g., how it is configured, or what interface it provides) will not generally impact the software architecture as a whole. On the other hand, a reference component may have properties that do affect the software architecture as a whole. For example, a logger component may collect logs of the whole software architecture, thereby fulfilling the logging requirement of an entire software stack.

Finally in FIG. 8, the software architecture may be evaluated (808). As described, the evaluation generally checks automatically whether requirements of software components are filled by properties existing in other components. In some implementations, the evaluation may be performed entirely automatically. In other implementations, the evaluation may be performed semi-automatically, and completed manually by the user 702.

As shown, the process of FIG. 8 may be executed iteratively. For example, the evaluation of the software architecture (808), may lead to further annotations of identified software components (806). Still further, the evaluation of the software architecture (808), may lead to an updated definition of the software architecture diagram as a whole.

Accordingly, the example of FIG. 8 should be understood to represent a number of different scenarios for constructing and evaluating a software architecture diagram. For example, in some implementations, the architecture diagram may be defined initially by creating new software components and importing software components, followed by annotation of all created/imported software components. In other example implementations, the software components created for the software architecture may be created and then annotated, while the imported software components already may have been previously annotated.

Thus, FIGS. 1 and 6-7 provide examples of a technical apparatus which enable annotations of software components, and associated properties, requirements, or dependencies may thus be taken into account to help define properties of an overall software architecture or other system being developed. Compliancy issues in software architectures can thus be detected, e.g., with respect to expected software standards.

As described, the various example techniques may use architecture diagrams as a starting point. By selecting software components in such architecture diagrams, software development life cycle actors can perform at least the following four actions: (i) annotate software components, (i) save components to a component library, (iii) import components to an existing software architecture and (iv) evaluate software architecture requirements with respect of compliance in relation to other software components.

Thus a software approach is described for solving problems related to the compliance of properties and requirements between new software systems and reused software components, as a way to predict properties to be considered in the context of the software development lifecycle. Such a solution can be used to systematically ensure that software architecture is consistent with requirements and defined properties, and that changes in software properties and requirements are taken into account. Moreover, a central repository may be created and utilized, in which functional and non-functional software characteristics are stored in a centralized and consistent way.

Described solutions are well adapted, for example, for use in complex application scenarios, which may be composed by software modules developed by multiple development groups. Besides speeding up the software development lifecycle process, a thorough documentation of software components is also ensured, as is communication across different communication units. The alert system also provides an efficient mechanism for ensuring that compliance, once reached, is kept, e.g., when the software development lifecycle reaches post-production phases.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
   access a previously created software component library in which each software component is associated with a respective annotation describing properties, requirements and dependencies of the software component as determined from a respective knowledge base, wherein a first software component having a first annotation is linked to a second software component having a second annotation based on a semantic relationship between a property of the first software component and a property of the second software component;
   import the first software component into a current software application under development and verify a first compliance of the first software component with the current software application architecture;
   verify a second compliance of the first software component with the second software component in the previously created software component library;
   include the second software component within the current software application under development, based on the second compliance; and
   generate a graphical user interface displaying a software architecture diagram for the current software application under development, wherein the first software component and the second software component are represented in the software architecture diagram and selectable therefrom for inclusion from the previously created software component library and for verification of the first and second compliances.

2. The computer program product of claim 1, wherein the second annotation characterizes a second property of the second software component.

3. The computer program product of claim 1, wherein the second annotation characterizes a requirement of the second software component, and further wherein the compliance includes a verification that the first property satisfies the requirement.

4. The computer program product of claim 1, wherein the instructions, when executed, are configured to cause the at least one computing device to:
   select the second software component, the second annotation, and the requirement; and
   search for a matching property within a software component of a software architecture of the current software application under development that fulfills the requirement.

5. The computer program product of claim 1, wherein the instructions, when executed, are configured to cause the at least one computing device to:
   generate the graphical user interface with the first software component and the second software component represented in the software architecture diagram and selectable therefrom for providing the first annotation and the second annotation, respectively.

6. The computer program product of claim 1, wherein the instructions, when executed, are configured to cause the at least one computing device to:
   determine an application requirement of the current software application under development; and
   search a software architecture of the current software application under development and the previously created software component library for a software property matching the application requirement.

7. The computer program product of claim 1, wherein the instructions, when executed, are configured to cause the at least one computing device to:
   include the first software component including adding the first software component within a software architecture of the current software application under development;
   determine an update to the first software component at the previously created software component library; and
   provide a notification of the update in the context of the software architecture.

8. The computer program product of claim 1, wherein the instructions, when executed, are configured to cause the at least one computing device to:
- compare the first software component within the software architecture of the current software application under development with the updated first software component at the previously created software component library; and
- identify a potential change to the first software component within the software architecture, based on the comparison.

9. The computer program product of claim 1, wherein the first annotation describes one or more of a type of programming language or library used by the first software component, requirements whether the first software component requires data to be validated at a particular time or in a particular manner, requirements on a configuring a firewall or an encryption algorithm utilized for the first software component, whether multi tenancy is supported by the first software component, and types of data that are stored, or techniques for associated data storage for the first software component.

10. A computer-implemented method for executing instructions stored on a non-transitory computer readable storage medium, the method comprising:
- accessing a previously created software component library in which each software component is associated with a respective annotation describing properties, requirements and dependencies of the software component as determined from a respective knowledge base, wherein a first software component having a first annotation is linked to a second software component having a second annotation based on a semantic relationship between a property of the first software component and a property of the second software component;
- importing the first software component into a current software application under development and verify compliance of the first software component with the current software application architecture;
- verifying compliance of the first software component with the second software component in the previously created software component library;
- including the second software component within the current software application under development, based on the compliance; and
- generate a graphical user interface displaying a software architecture diagram for the current software application under development, wherein the first software component and the second software component are represented in the software architecture diagram and selectable therefrom for inclusion from the previously created software component library and for verification of the first and second compliances.

11. The method of claim 10, wherein the second annotation characterizes a requirement of the second software component, and further wherein verifying the compliance includes verifying that the property of the first software component satisfies the requirement.

12. The method of claim 10, wherein importing the first software component includes:
- adding the first software component within a software architecture of the current software application under development;
- determining an update to the first software component at the previously created software component library; and
- providing a notification of the update in the context of the software architecture.

13. The method of claim 10, further comprising:
- comparing the first software component within the software architecture with the updated first software component at the previously created software component library; and
- identifying a potential change to the first software component within the software architecture, based on the comparison.

14. The method of claim 10, wherein the first annotation describes one or more of a type of programming language or library used by the first software component, requirements whether the first software component requires data to be validated at a particular time or in a particular manner, requirements on configuring a firewall or an encryption algorithm utilized for the first software component, whether multi tenancy is supported by the first software component, and types of data that are stored, or techniques for associated data storage for the first software component.

15. A system including instructions recorded on a non-transitory computer-readable storage medium, and executable by at least one processor, the system comprising:
- a component selector configured to access a previously created software component library in which each software component is associated with a respective annotation describing properties, requirements and dependencies of the software component as determined from a respective knowledge base, wherein a first software component having a first annotation is linked to a second software component having a second annotation based on a semantic relationship between a property of the first software component and a property of the second software component, the component selector further configured to import the first software component into a current software application under development and verify compliance of the first software component with the current software application architecture;
- an evaluation engine configured to verify compliance of the first software component with the second software component in the previously created software component library and include the second software component within the current software application under development, based on the compliance;
- a component update monitor configured to re-verify the compliance, after an update to at least one of the first software component and the second software component in the previously created software component library; and
- a component configured to generate a graphical user interface displaying a software architecture diagram for the current software application under development, wherein the first software component and the second software component are represented in the software architecture diagram and selectable therefrom for inclusion from the previously created software component library and for verification of the first and second compliances.

16. The system of claim 15, wherein the component selector is configured to modify the first annotation, based on a selection of the first software component from within a software architecture diagram of the software application under development.

17. The system of claim 15, wherein the evaluation engine is further configured to:

determine a second requirement of the second software component;

search software components of the software application under development and the previously created software component library for a matching property the fulfills the second requirement; and determine whether the second requirement can be fulfilled by one or more properties of the software components of the software application under development and the previously created software component library, based on the search.

18. The system of claim 15, wherein the component update monitor is further configured to:

detect the update as an update to the first software component within the previously created software component library;

compare the updated first software component within the previously created software library to the first software component imported within the software application under development; and determine whether a corresponding update to the first software component as imported within the software application under development is required, based on the comparison.

19. The system of claim 15, wherein the first annotation describes one or more of a type of programming language or library used by the first software component, requirements whether the first software component requires data to be validated at a particular time or in a particular manner, requirements on configuring a firewall or an encryption algorithm utilized for the first software component, whether multi tenancy is supported by the first software component, and types of data that are stored, or techniques for associated data storage for the first software component.

* * * * *